US00RE34923E

United States Patent [19]

Ruesch

[11] E Patent Number: Re. 34,923

[45] Reissued Date of Patent: May 2, 1995

[54] VALVE STEM SEAL LEAK PROTECTION AND DETECTION APPARATUS

[75] Inventor: J. O. Ruesch, Wadenswil, Switzerland

[73] Assignee: Neotecha AG, Hombrechtikon, Switzerland

[21] Appl. No.: 981,795

[22] Filed: Nov. 25, 1992

Related U.S. Patent Documents

Reissue of:

[64] Patent No.: 4,972,867
Issued: Nov. 27, 1990
Appl. No.: 431,665
Filed: Nov. 3, 1989

[51] Int. Cl.[6] ..... F16K 43/00; G01M 3/08

[52] U.S. Cl. ..... 137/15; 73/46; 137/312; 137/315; 251/214; 277/2; 277/17

[58] Field of Search ..... 137/2, 15, 312, 315; 73/40, 46; 251/214; 277/2, 15, 16, 17, 19, 21

[56] References Cited

U.S. PATENT DOCUMENTS

| | | | |
|---|---|---|---|
| 909,479 | 1/1909 | Thwing | 277/19 |
| 1,606,715 | 11/1926 | Miller | 137/312 |
| 2,156,498 | 5/1939 | Hinrichs | 137/312 |
| 2,691,773 | 10/1954 | Lichtenberger | 137/312 |
| 2,954,797 | 10/1960 | Dryer | 137/312 |
| 3,209,830 | 10/1965 | Orr et al. | 277/2 |
| 3,219,059 | 11/1965 | Williams et al. | 137/625.3 |
| 3,307,574 | 3/1967 | Anderson | 137/312 |
| 3,392,983 | 7/1968 | Hajner | 277/28 |
| 3,563,508 | 2/1971 | DeLorenzo | 251/63.5 |
| 3,838,707 | 10/1974 | Wachowitz | 137/312 |
| 3,887,196 | 6/1975 | Renfrow | 277/2 |
| 3,955,822 | 5/1976 | Irby | 277/2 |
| 3,972,396 | 8/1976 | Bochnak | 277/2 |
| 4,010,769 | 3/1977 | DeLorenzo et al. | 137/312 |
| 4,304,251 | 12/1981 | Schadel et al. | 137/240 |
| 4,515,344 | 5/1985 | Gemignani | 251/63.5 |
| 4,573,344 | 3/1986 | Ezekoye | 73/46 |
| 4,694,848 | 9/1987 | Jorgensen et al. | 137/312 |
| 4,834,137 | 5/1989 | Kawaguchi et al. | 137/312 |

FOREIGN PATENT DOCUMENTS

| | | | |
|---|---|---|---|
| 1073261 | 12/1961 | Germany | 73/261 |
| 1267923 | 1/1969 | Germany . | |
| 1916325 | 11/1976 | Germany . | |

*Primary Examiner*—George L. Walton
*Attorney, Agent, or Firm*—Fish & Richardson

[57] ABSTRACT

A safety structure for detecting fluid leakage from a valve having an exposed end of a rotatable valve stem connected to a valve element within the valve for rotating the valve element between an open and a closed position. The safety structure comprises a jacket, and an elongated handle extension disposed within the jacket for rotation about its axis. The handle extension includes an end which extends outward from the jacket for turning the handle extension. The jacket terminates in an annular flange which is attached to the valve in an isolating configuration having the exposed end of the valve stem covered, and the handle extension connected to valve stem via a slot on the lower end of the handle extension and a pair of opposed flats on the covered end of the rotatable valve stem over which the slot extends for transferring the rotation of the handle extension to the valve stem. A sealed chamber in the jacket surrounds the elongated handle and extends along the handle in the isolating configuration to communicate with the rotatable valve stem and isolate the covered end of the rotatable valve stem. A leakage detector is connected to a sniffer port in the jacket which communicates with the sealed chamber and detects leakage from the valve around the rotatable valve stem. A fluid reservoir is connected with a collection port in the jacket which communicates with the sealed chamber and collects fluid leakage from the valve around the rotatable valve stem.

28 Claims, 1 Drawing Sheet

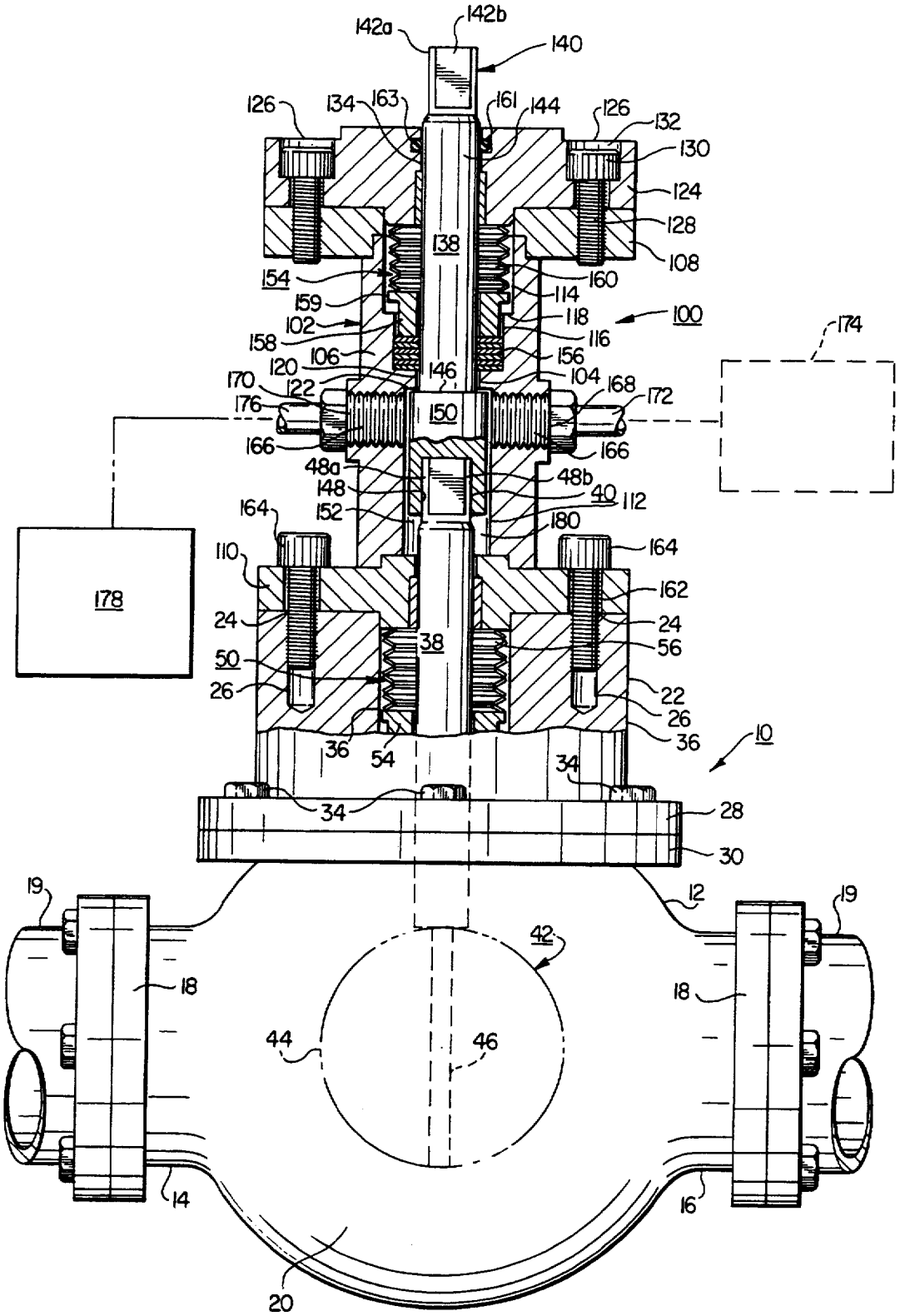
142a
142b
140
126
134
163
161
144
126
132
130
124
128
108
138
154
160
159
114
102
118
100
158
116
106
156
120
146
104
170
122
168
176
150
172
166
166
48a
48b
148
40
112
164
152
180
164
110
162
178
24
24
38
56
50
26
22
26
36
36
54
34
10
34
28
30
19
12
19
42
18
18
44
46
14
16
20

VALVE STEM SEAL LEAK PROTECTION AND DETECTION APPARATUS

Matter enclosed in heavy brackets [ ] appears in the original patent but forms no part of this reissue specification; matter printed in italics indicates the additions made by reissue.

BACKGROUND OF THE INVENTION

The present invention relates generally to a safety structure for detecting and enclosing fluid leakage around a valve. More particularly, the present invention is concerned with safety structure for detecting and preventing fluid leakage around an exposed rotatable stem of a valve having a element connected to the stem which is rotated between an open and a closed position to control fluid flow through the valve.

Valves are commonly used to control fluid flow through pipelines and other fluid circulating systems. One such valve in common use is a valve having a rotatable valve element disposed within the valve which is rotated a quarter of an turn between an open and a closed position for controlling fluid flow through the valve. A rotatable non-rising valve stem extends from the exterior of the valve into the valve body to connect with the valve element for rotating the valve element between its open and its closed position. A single seal structure between the valve body and the externally projecting valve stem circumscribes the valve stem and prevents leakage from the interior of the valve past the valve stem. However, such single seal valves are eventually subject to leakage around their seal structure due to wear or failure of the seal structure between the body of the valve and the valve stem. With the increasing emphasis on environmental quality, leakage of gas, oil, or other toxic or hazardous fluid to the environment surrounding the valve is unacceptable. Consequently, a need exists for a retrofittable structure which may be added to the valve to contain or sense leakage around its single seal structure and prevent leakage of gas, oil, or other toxic or hazardous fluid to the environment surrounding the valve.

A large number of such single seal valves are already in use, and the manufacture of this type of valve continues. Consequently, there is a great need for a retrofit structure for this type of valve to enclose the external portion of the valve stem for detecting and preventing leakage of gas, oil, or other toxic or hazardous fluid around the seal structure of the valve so as to avoid such toxic or hazardous fluid escaping to the environment.

SUMMARY OF THE INVENTION

The present invention provides a novel method and safety structure usable with a valve having a valve body, a rotatable stem disposed in the valve body, and a rotatable element located in the valve body which is attached to the valve stem for rotation therewith for controlling fluid flow through the valve. The safety structure detects fluid escaping from the valve due to wear or failure o the primary seal between the body of the valve and the valve stem and prevents fluid escaping from the valve due to wear or failure of the primary seal between the body of the valve and the valve stem.

The safety structure of the present invention can be removably attached to the valve or can be made integral with the valve. The safety structure will allow the valve to continue to function properly regardless of minor seal leakage around the valve stem, and, if leakage should develop, vents the leaked fluid into a fluid reservoir.

The preferred embodiment of the safety structure according to the present invention includes a jacket and a non-rising elongated handle extension disposed within the jacket for rotation about its axis. The jacket is adapted to be removably secured to the valve in an isolating configuration covering the outwardly projecting end of the valve stem with one end of the handle extension adjacent the outwardly projecting end of the valve stem in a connecting configuration therewith for transferring the rotation of the handle extension to the valve stem. The opposite end of the handle extension projects outwardly from the jacket and includes wrench flats over which a spanner or handwheel is positioned for rotating the handle extension. In the isolating configuration, a sealed, essentially unpressurized chamber in the jacket extends along the handle extension to connect around the projecting end of the valve stem, isolating the covered end of the valve stem from the environment surround the valve. A collecting port communicates with the sealed chamber and is vented to a reservoir for collecting fluid leakage into the chamber from the valve past the primary seal between the body of the valve and the rotatable valve stem. A sniffer port communicates with the sealed chamber and is connected to a fluid detection device which detects fluid leakage into the chamber from the valve past the primary seal between the body of the valve and the rotatable valve stem.

The present invention thus provides a safety structure which obviates the need for costly servicing when minor wear occurs in the primary seal region, resulting in slight leakage of fluid around the primary seal between the body of the valve and the rotatable valve stem. In addition, the invention provides structure for venting the leaking fluid into a reservoir for storage, which prevents leakage of the fluid into the air or medium surrounding the valve. With caustic or poisonous fluids, the leaked fluid can cause serious damage to the medium surrounding the valve, the environment or to life itself. Because some of these fluids are odorless and for other reasons, small amounts of leakage to the medium surrounding the valve may not be detected until serious damage may occur. Thus, the invention provides structure for detecting any leakage of fluid around the primary seal between the body of the valve and the rotatable valve stem. Further, the invention provides structure which prevents serious leaks due to failure of the primary seal between the body of the valve and the rotatable valve stem until the system can be shut down and orderly repairs made to the primary seal. Hence, loss of large amounts of fluids which may be dangerous and high production losses which may be costly are prevented.

The above features of the present invention will become apparent from the drawings, the description given herein, and the appended claims.

BRIEF DESCRIPTION OF THE DRAWING

The invention may be more fully understood by reference to the following description of the preferred embodiment in conjunction with the drawing and wherein the single FIGURE is a side view, partly in section, of the preferred embodiment of the safety structure of the present invention which is shown attached to a valve, partly in section, having a valve element rotatable between an open and a closed position for opening and closing the valve.

DETAILED DESCRIPTION of the PREFERRED EMBODIMENT

Referring to the drawing, a common disc valve 10 for which the present invention is suitable, is illustrated. Valve 10 comprises a valve body 12 having an inlet passage 14 and an outlet portion 16 formed integrally therewith. Typically, an annular flange 18 is formed on the inlet and outlet portions 14, 16 of valve 10 and adapts valve 10 to be bolted into a pipe system 19. Conventionally, valve body 12 has a chamber 20 for communicating inlet portion 14 with outlet portion 16. Valve body 12 terminates upwardly in a circular neck portion 22 having a bolt circle 24 along which spaced threaded bores 26 are arranged. Neck portion 22 terminates downwardly in an annular flange 28 which is located on the upper flange 30 of valve body 12. Flange 28 has a bolt circle which corresponds with spaced threaded bores in flange 30. Conventionally, bolts 34 are inserted through bolt circle of flange 28 and into corresponding threaded bores in flange 30 for attaching flange 28 against valve body 12.

A bore 36 located in the center of bolt circle 24 extends downwardly through valve body 12 to connect with chamber 20. A non-rising, elongated valve stem 38 extends downwardly through bore 36 into chamber 20. Valve stem 38 is mounted within bore 36 for rotation about its longitudinal axis and has an end 40 which extends outward from body 12 for rotating valve stem 38 about its axis. Valve stem 38 is connected at its lower end to a disc shaped valve member 42 for controlling fluid flow through valve 10. Valve member 42 is disposed in chamber 20, and valve stem 38 conventionally rotates valve member 42 ninety degrees between an open position as illustrated by phantom lines 44 and a closed position as shown by dotted lines 46 of the FIGURE. End 40 has opposed pairs of wrench flats 48a, 48b over which a conventional spanner or handwheel, not shown in the FIGURE, may be positioned for rotating valve stem 38 and selectively rotating valve member 42 between its open position and its closed position.

An annular seal structure 50 is positioned sealingly in the annular space between valve stem 38 and bore 36 and circumscribes valve stem 38 to prevent fluid leaking from the interior of valve 10 outwardly from the upper end of bore 36. Conventionally, seal structure 50 provides a primary seal to prevent leakage from bore 36 and includes an annular elastomeric seal portion, not shown in the FIGURE, an annular spacer 54 and an annular bellows portion 56 which is compressed against spacer 54 by tightening a circular cover plate, not shown in the FIGURE against valve body via bolts inserted through a bolt circle in the cover plate into threaded bores 26. Conventionally, tightening the cover plate against valve body 12 compresses bellows portion 56 and forces spacer 54 downwardly against seal portion 52, thus expanding seal portion 42 in a radial direction for a sealing engagement with valve stem 38 and bore 36. Failure of seal structure 50 over time due to the frictional rotation of valve 36 against seal portion 52 causes the seal to wear and allows fluid leakage outwardly from the upper end of bore 35. As environmental and safety standards continue to be increased, this condition becomes less and less acceptable, particularly in the case where a toxic or hazardous fluid is being flowed through valve 10.

Referring to the FIGURE, the preferred embodiment of a safety structure 100 usable with conventional disc valve 10 for detecting and preventing fluid leakage to the atmosphere from around the primary seal structure 50 located in bore 36 and through which valve stem 38 extends, is shown attached to valve body 12. Safety structure 100 includes an elongated jacket 102 through which a longitudinal bore 104 extends. As shown in the FIGURE, jacket 102 includes a cylindrical middle portion 106 which has upper and lower flanges 108, 110 attached around its opposed ends by suitable means such as continuous welding so that jacket 102 is leak proof, with longitudinal bore 104 extending longitudinally through middle portion 106 and centrally through bores in flanges 108, 110.

Bore 104 includes a first counterbore 112 extending upwardly form the lower face of middle portion 106 and into middle portion 106, and a second counterbore 114 extending downwardly from the upper face of upper flange 108 through 108 and into middle portion 106. At the bottom of counterbore 114, a narrower, aligned third counterbore 116 extends downwardly into middle portion 106. A shoulder 118 is formed between the bottom of counterbore 116 extends downwardly into counterbore 116 by the annular portion of middle portion 106 which extends radially from the bottom of counterbore 114 to intersect with counterbore 116.

For connecting first and third counterbore 112, 116, bore 104 includes an aligned bore 120 which is narrower than counterbores 112, 116. A downwardly facing lip 122 is formed between the top of counterbore 112 and the entrance to aligned bore 120 by the annular portion of middle portion 106 which extends radially from the top of counterbore 112 to intersect with aligned bore 120.

A covering flange 124 is attached over upper flange 108. Covering flange 124 includes a bolt circle 126 which corresponds with spaced threaded bores 128 in the upper face of upper flange 108. Bolts in the form of cap screws 130 are inserted through bolt circle 126 and into corresponding threaded bores 128 for attaching flange 124 against flange 108 for purposes as described below. As shown in the FIGURE, bolt circle 126 may include countersunk portions 132 for enclosing the heads of cap screws 130.

Bore 104 includes an aligned bore 134 located in the center of covering flange 124, and an aligned bore 136 located in the center of lower flange 110. Bore 134 is narrower than second counterbore 114 and connects with counterbore 114. Bore 136 is narrower than first counterbore 112 and connects with counterbore 112.

Positioned in bore 104 is a non-rising, elongated handle extension 138. Handle extension 138 extends downward through bore 134, second counterbore 114, third counterbore 116, aligned bore 120, and into counterbore 112. Handle extension 138 has an end 140 which protrudes upwardly form covering flange 124, and which is provided with opposed wrench flats 142a, 142b over which a conventional spanner or handwheel, not shown in the FIGURE, may be positioned for rotating handle extension 138 about its longitudinal axis.

Handle extension 138 has an elongated, circular shaft portion 144 which is somewhat narrower than bore 134 and which extends through bore 134, second counterbore 114, third counterbore 116 and aligned bore 120. At the lower end of shaft the bottom of portion 144, an annular shoulder 146 extends radially from shaft portion 144 in the upper portion of first counterbore 112. Shoulder 146 has a diameter somewhat less than the diameter of first counterbore 112 so that shoulder 146 can rotate in counterbore 112, and slidably abuts against downwardly facing lip 122 to prevent handle extension 138 from moving axially upward and out of bore 104.

The lower end of handle extension 138 is provided with a rotational transfer means at its lower end. As shown in the FIGURE, the rotational transfer means may comprise a slot 148 in the lower end of the handle extension. However, the rotational transfer means may comprise other structures such as a box socket. As shown in the FIGURE, handle extension 138 is provided with a circular elongation 150 which extends downwardly form shoulder 146, and which may be formed integrally with shoulder 146 or attached thereto by suitable means such as welding. As shown in the FIGURE, bore 136 is narrower than circular elongation 150 to prevent handle extension 138 from moving axially downwardly and out of bore 104. Consequently, handle extension 138 should be assembled in bore 104 before flange 110 is attached to middle portion 106.

Extending upwardly into elongation 150 is slot 148. Slot 148 is provided with suitable dimensions so that slot 148 can be slid over wrench flats 48a, 48b. Slot 148 is located in elongation 150 so that slot 148 extends over flats 48a, 48b when safety structure 100 is attached to valve 10 as described below.

With handle extension 138 assembled in bore 104 and flange 110 attached to middle portion 106, the annular space in counterbore 112 surrounding elongation 150 provides a chamber 152 which connects with bore 136. A seal structure 154 is positioned within counterbores 114, 116 which circumscribes shaft portion 144 of elongated handle extension 138 and prevents communication from chamber 152 upward through aligned counterbores 116, 114 and bore 134 of bore 104. Conventionally, seal structure 154 includes an annular elastomeric seal portion 156, an annular spacer 158, and an annular bellows portion 160. As shown in the FIGURE, seal portion 156 is disposed in the bottom of counterbore 116, and spacer 158 extends downwardly into counterbore 116 in abutement against seal portion 156. Bellows portion 160 is disposed in counterbore 114 above spacer 158 and abuts against the upper face of spacer 158. As shown in the FIGURE, spacer 158 may include an annular lip 159 around its upper end which abuts against shoulder 118 to prevent over compression of seal portion 156. Spacer 158 is compressed against seal portion 156 by tightening covering flange 124 against upper flange 108 via cap screws 130. Tightening covering flange 124 against valve body 12 compresses bellows portion 160 downwardly against spacer 158, thus compressing seal portion 156 and expanding seal portion 156 in a radial direction for a sealing engagement around shaft portion 144 and counterbore 116. As shown in the FIGURE, an o-ring 161 may be positioned in an annular groove 163 in bore 134 and circumscribes valve stem 138.

Lower flange 110 is provided with a bolt circle 162 which corresponds with threaded bores 26. Bolts 164 inserted through bolt circle 162 into threaded bores 26 attach safety structure 100 against valve 10. An annular gasket, not shown in the FIGURE, located between the lower face of flange 100 and the upper face of neck portion 22 provides a seal between flange 110 and neck portion 22.

A lateral bore 166 provided in middle portion 106 before assembling elongated handle extension 138 in bore 104 supplies a pair of aligned ports 168, 170 which connect with chamber 152. Port 168 provides a sniffer port, and a tube 172 connected to sniffer port 168 leads to a conventional fluid detector such as a gas detection device, indicated by dotted lines 174. Port 170 provides a collection port, and a drain tube 176 connected to collection port 170 leads to a conventional sealed fluid reservoir 178.

In operation, pipe system 19 is closed off to fluid flow. Safety structure 100 is positioned on neck portion 22 of valve 10 over the exposed end 40 of valve stem 38, and slot 148 in circular elongation 150 is slid downwardly over wrench flats 48a, 48b so that slot 148 extends over wrench flats 48a, 48b. Lower flange 110 may then be rotated so that bolt circle 162 aligns with threaded bores 26. Bolts 164 inserted through bolt circle 162 and into threaded bores 26 are tightened, attaching safety structure 100 against neck portion 22 of valve body 12, and compressing bellows portion 56 and forcing spacer 54 downwardly against seal portion 52, thus expanding seal portion 42 in a radial direction for a sealing engagement with valve stem 38 and bore 36.

Tightening flange 110 against valve body 12 attaches safety structure 100 in an isolating configuration covering exposed end 40 of rotatable valve 38 having handle extension 138 disposed coaxial and adjacent covered end 40 of rotatable valve 38, as shown in the FIGURE. With safety structure 100 attached to valve 10 via bolts 164, a rotational transfer means is included with handle extension 138 for connecting handle extension 138 to rotatable valve stem 38 to transfer the rotation of handle extension 138 to rotatable valve stem 38. As shown in the FIGURE, the rotational transfer means is provided by circular elongation 150 and slot 148, although other arrangements which provides for rotational transfer between handle extension 138 and valve stem 138 are also within the scope of the invention.

Secondly, tightening flange 110 against valve 10 in the isolating configuration, seals chamber 152 from the exterior medium surrounding the valve, which may be atmospheric and forms a sealed, essentially unpressurized chamber 180 which extends downward along handle extension 138 to communicate with the covered end 40 of valve stem 38. Thus, end 40 is isolated from the exterior medium surrounding valve 10.

With safety structure 100 attached in its isolating configuration against valve body 12, seal portion 52 of seal structure 50 is expanded into a sealing engagement against valve stem 8 and bore 36 as discussed above. Thus, pipe system 19 may be reopened to fluid flow. A conventional spanner or handwheel, not shown in the FIGURE, may be positioned over wrench flats 132a, 132b for turning handle extension 138 about its longitudinal axis, with the rotational transfer means transferring the rotation of the handle extension 138 to valve stem 38 so that fluid flow through valve 10 may be controlled.

In the event of leakage past primary seal structure 50, the leakage can be detected by a conventional fluid detector, indicated by dotted lines at 174, such as a gas detector which is connected to the end 40 of valve stem 38 via detection tube 172, sniffer port 168, and sealed chamber 180. Thus, leakage of small amounts of dangerous or caustic fluid can be detected without being leaked to the medium surrounding valve 10. Secondly, small amounts of leakage can be trapped and retained by a sealed fluid reservoir, indicated at 178, which is connected to the end 40 of valve stem 38 via drain tube 176, collection port 170, and sealed chamber 180. Thus, valve 10 may remain operative until repair work can be orderly implemented. Thirdly, in the event of failure of primary seal structure 50, seal structure 154 provides a secondary seal which prevents leakage of fluid to the medium surrounding the valve 10, while fluid detector 174 provides detection of the leakage. Thus, large amounts of fluid leakage can be prevented, along with lost production and potential damage to the environment or life itself, allowing orderly shutdown procedure and repairs to be made to seal structure 50.

In a further embodiment, safety structure 100 can be formed integrally with valve 10. With this embodiment, valve stem 38 and handle extension 138 may be fabricated together as one piece.

The embodiment described herein in detail for exemplary purposes are subject to many different variations in structure, design, application and methodology. Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. An add on safety structure usable with a valve having a rotatable valve stem connected to a valve element located within the valve for rotating the valve element ninety degrees between an open and a closed position to control fluid flow through the valve by manipulating the rotatable exposed end of the valve stem, said valve stem having a stem sealing means adjacent a valve sealing means, comprising:

a jacket means adapted to be removably secured directly to the valve through a valve neck portion over the rotatable end of the valve stem in an isolating configuration covering the rotatable end of the valve stem, said jacket means including flange means so as to be removable as a single unit and adapted to be removably secured to the valve neck portion, said flange means for compressing the seal means disposed within the valve neck portion to provide a seal around the valve stem when said flange means is secured to said valve;

an elongated handle extension means rotatable ninety degrees about its axis and extending through said jacket means in said isolating configuration adjacent the rotatable end of the valve stem in a connecting configuration with the rotatable end of the valve stem for transferring the rotation of said elongated handle extension means to said valve stem, said handle extension means having an end extending from said jacket means for turning said handle extension means about its axis; and, a safety chamber in said jacket means communicating with the rotatable end of the valve stem for preventing escape to the medium surrounding the valve of leakage from around the rotatable end of the valve stem.

2. The safety structure of claim 1, wherein there is further included means for detecting leakage into said chamber from around the rotatable end of the valve stem.

3. The safety structure of claim 1, wherein there is further provided means for collecting leakage into said chamber from around the rotatable end of the valve stem.

4. A safety structure for detecting fluid leakage from a valve having an exposed end of a rotatable valve stem connected to a valve element located within the valve for rotating the valve element between an open and a closed position to control fluid flow throught through the valve, comprising:

a jacket means;

an elongated handle extension means disposed within said jacket means for rotation about its longitudinal axis, said handle extension means having an end extending outwardly from said jacket means for turning said handle extension means;

means included with said jacket means for attaching said jacket means directly to the valve through a valve neck portion in an isolating configuration covering the exposed end of the rotatable valve stem, said isolating configuration having said handle extension means coaxial and adjacent the covered end of the rotatable valve stem, said means for attaching in said isolating configuration including flange neck portion mean attached to said jacket means so as to be removable as a single unit and adapted to be removably secured to the valve, and fastening means for removably fastening said flange means to the valve neck portion, said flange means for compressing a seal means disposed within the valve neck portion to provide a seal around the valve stem when said flange portion is secured to said valve neck portion;

rotational transfer means included with said handle extension means adjacent the covered end of the rotatable valve stem for connecting said handle extension means to the rotatable valve stem to transfer the rotation of said handle extension means to said rotatable valve stem;

a sealed chamber in said jacket means surrounding said elongated handle extension means and extending along said handle extension means in said isolating configuration to communicate with the covered end of the rotatable valve stem for isolating the covered end of the rotatable valve stem; and, means for detecting leakage from the valve into said chamber from around the covered end of the rotatable valve stem.

5. The safety structure of claim 4, wherein said means for detecting leakage form the valve includes a port communicating with said chamber, and a leakage detector connected to said port.

6. The safety structure of claim 4, wherein there is further provided means for collecting leakage into said chamber from around the covered end of the rotatable valve stem.

7. The safety structure of claim 6, where said means for collecting leakage includes a port communicating with said chamber, and a reservoir connected to said port.

8. The safety structure of claim 4, wherein said jacket means includes a bore through which said handle extension means extends for rotation about its longitudinal axis.

9. The safety structure of claim 8, wherein there is further included a seal structure sealingly disposed in said bore between said jacket means and said handle extension means in a position preventing communication from said chamber through said bore to the medium surrounding said valve.

10. The safety structure of claim 9, wherein said seal structure includes an annular elastomeric element.

11. The safety structure of claim 10, wherein said seal structure further includes an annular spacer having a contacting relationship with said elastomeric element, and a bellows portion biasing said spacer against said elastomeric element to expand said seal portion radially for a sealing engagement with said bore and said handle extension means.

12. The safety structure of claim 4, wherein said means for attaching said jacket means in said isolating configuration includes an annular flange means extending radially outward from said jacket means, fastening means associated with said flange means and said valve neck portion for fastening said flange means to said jacket means, and an annular seal sealingly disposed between said flange means and said valve neck portion.

13. The safety structure of claim 12, 4, wherein said fastening means includes a bolt circle in said flange means, a plurality of corresponding threaded bores in said valve, and a number of bolts disposed through said bolt circle in a threaded engagement in said a plurality of corresponding threaded bores in the valve neck portion.

14. The safety structure of claim 4, wherein said rotational transfer means includes a slot in said handle extension means adjacent the covered end of the rotatable valve stem, and wherein the covered end of the rotatable valve stem includes opposed wrench flats over which said slot extends.

15. A valve, comprising:

a valve body having an inlet and an outlet;

a rotatable valve element disposed in said valve body between said inlet and said outlet, said valve element rotatable between an open and a closed position to control fluid flow from said inlet to said outlet;

a jacket means extending from said valve neck portion, said jacket means and said valve neck portion having a coaxially aligned bores, said bore in said valve neck portion providing an interior bore;

a rotatable valve stem extending through said coaxially aligned bores, said rotatable valve stem connecting to said rotatable valve element for rotating said valve element, said valve stem having a rotational means extending outwardly from said jacket means for turning said valve stem;

a pair of spaced seal structures sealingly disposed in said coaxially aligned bores between said bores and said valve stem for preventing fluid leakage from said coaxially aligned bores, said seal structure in said interior bore providing a primary seal structure, said jacket means including flange means extending therefrom so as to be removable as a single unit and adapted to be directly secured to said valve neck portion over said interior bore, said flange means for compressing said primary seal structure to provide a sealing engagement within said interior bore and around said valve stem when said flange means is secured to said valve neck portion over said interior bore;

a sealed, essentially unpressurized chamber in said jacket means between said coaxially aligned bores for isolating said interior bore; and port means in said jacket means connecting with said chamber for passing fluid leaking into said chamber from said valve neck portion to a structure exterior said jacket means.

16. The valve of claim 15, wherein said port means is a sniffer port, and wherein said structure exterior said jacket means is a leakage detector connected to said sniffer port.

17. The valve of claim 15, wherein said port means is a collection port, and wherein said structure exterior said jacket means is a reservoir connected to said collection port.

18. The valve of claim 15, wherein said rotational means includes opposed wrench flats.

19. The valve of claim 15, wherein said seal structure includes an annular elastomeric element.

20. The safety structure of claim 19, wherein said seal structure further includes an annular spacer having a contacting relationship with said elastomeric element, and a bellows portion biasing said spacer against said elastomeric element to expand said seal portion radially for a sealing engagement with said bore and said valve stem.

21. The valve of claim 15, wherein said sealed chamber is a second bore in said jacket means through which said valve stem extends, and wherein said spaced seal structures isolate said second bore.

22. A method of detecting leakage from a valve having an exposed rotatable valve stem extending therefrom for opening and closing the valve, comprising the steps of:

attaching a jacket to a valve neck portion in a configuration covering the exposed rotatable valve stem, said jacket means having flange means extended therefrom so as to be removable as a single unit and adapted to be directly secured to said valve neck portion;

concurrently by the step of attaching, providing a primary seal structure, said flange means for compressing said primary seal structure to prove a sealing engagement within said valve neck portion and around said valve stem when said flange means is secured to said valve neck portion;

providing a rotatable handle extension in the jacket having a first end extending from the jacket for turning the extension about its axis and a second end connecting the handle extension to the valve stem for transferring the rotation of the handle extension to the valve stem;

providing a seal chamber in the jacket communicating with the exposed rotatable valve stem for isolating the exposed rotatable valve stem by attaching the jacket to the valve; and, sampling the fluid of the sealed chamber for fluid leakage around the valve stem past the primary seal.

23. The method of claim 22, wherein there is further included the step of communicating the sealed chamber to a fluid reservoir for collecting fluid leaking around the valve stem.

24. The method of claim 22, wherein there is further included the step of turning the first end of the rotatable handle extension for opening and closing the valve.

*25. An add on safety structure usable with a valve having a rotatable valve stem connected to a valve element located within the valve for rotating the valve element ninety degrees between an open and a closed position to control fluid flow through the valve by manipulating the rotatable exposed end of the valve stem, comprising:*

*a jacket means adapted to be removably secured directly to the valve through a valve neck portion over the rotatable end of the valve stem in an isolating configu-*

*ration covering the rotatable end of the valve stem, said jacket means including flange means so as to be removable as a single unit and adapted to be removably secured to the valve neck portion;*

*an elongated handle extension means rotatable ninety degrees about its axis and extending through said jacket means in said isolating configuration adjacent the rotatable end of the valve stem in a connecting configuration with the rotatable end of the valve stem for transferring the rotation of said elongated handle extension means to said valve stem, said handle extension means having an end extending from said jacket means for turning said handle extension means about its axis;*

*and a safety chamber in said jacket means communicating with the rotatable end of the valve stem for preventing escape to the medium surrounding the valve of leakage from around the rotatable end of the valve stem.*

*26. A safety structure for detecting fluid leakage from a valve having an exposed end of a rotatable valve stem connected to a valve element located within the valve for rotating the valve element between an open and a closed position to control fluid flow through the valve, comprising:*

*a jacket means;*

*an elongated handle extension means disposed within said jacket means for rotation about its longitudinal axis, said handle extension means having an end extending outwardly form said jacket means for turning said handle extension means;*

*means included with said jacket means for attaching said jacket means directly to the valve through a valve neck portion in an isolating configuration covering the exposed end of the rotatable valve stem, said isolating configuration having said handle extension means coaxial and adjacent the covered end of the rotatable valve stem, said means for attaching in said isolating configuration including flange neck portion means attached to said jacket means so as to be removable as a single unit and adapted to be removably secured to the valve, and fastening means for removably fastening said flange means to the valve neck portion;*

*rotational transfer means included with said handle extension means adjacent the covered end of the rotatable valve stem for connecting said handle extension means to the rotatable valve stem to transfer the rotation of said handle extension means to said rotatable valve stem;*

*a sealed chamber in said jacket means surrounding said elongated handle extension means and extending along said handle extension means in said isolating configuration to communicate with the covered end of the rotatable valve stem for isolating the covered end of the rotatable valve stem; and*

*means for detecting leakage from the valve into said chamber from around the covered end of the rotatable valve stem.*

*27. A valve, comprising:*

*a valve body having an inlet and an outlet;*

*a rotatable valve element disposed in said valve body between said inlet and said outlet, said valve element rotatable between an open and a closed position to control fluid flow from said inlet to said outlet;*

*a jacket means extending from a valve neck portion, said jacket means and said valve neck portion having coaxially aligned bores, said bore in said valve neck portion providing an interior bore;*

*a rotatable valve stem extending through said coaxially aligned bores, said rotatable valve stem connecting to said rotatable valve element for rotating said valve element, said valve stem having a rotational means extending outwardly from said jacket means for turning said valve stem;*

*a pair of spaced seal structures sealingly disposed in said coaxially aligned bores between said bores and said valve stem for preventing fluid leakage from said coaxially aligned bores, said seal structure in said interior bore providing a primary seal structure, said jacket means including flange means extending therefrom so as to be removable as a single unit and adapted to be directly secured to said valve neck portion over said interior bore;*

*a sealed, essentially unpressurized chamber in said jacket means between said coaxially aligned bores for isolating said interior bore; and,*

*port means in said jacket means connecting with said chamber for passing fluid leaking into said chamber from said valve neck portion to a structure exterior said jacket means.*

*28. A method of detecting leakage from a valve having an exposed rotatable valve stem extending therefrom for opening and closing the valve, comprising the steps of:*

*attaching a jacket means to a valve neck portion in a configuration covering the exposed rotatable valve stem, said jacket means having flange means extended therefrom so as to be removable as a single unit and adapted to be directly secured to said valve neck portion;*

*concurrently by the step of attaching providing a primary seal structure to provide a sealing engagement around said valve stem when said flange means is secured to said valve neck portion;*

*providing a rotatable handle extension in the jacket having a first end extending from the jacket for turning the extension about its axis and a second end connecting the handle extension to the valve stem for transferring the rotation of the handle extension to the valve stem;*

*providing a sealed chamber in the jacket communicating with the exposed rotatable valve stem for isolating the exposed rotatable valve stem by attaching the jacket to the valve; and,*

*sampling the fluid of the sealed chamber for fluid leakage around the valve stem past the primary seal.*

* * * * *